(12) United States Patent
Ozturk et al.

(10) Patent No.: US 9,860,784 B2
(45) Date of Patent: Jan. 2, 2018

(54) TECHNIQUES FOR SCHEDULING COMMUNICATIONS IN WIRELESS NETWORKS WITH TRAFFIC AGGREGATION

(71) Applicant: QUALCOMM Incorporated, San Diego, CA (US)

(72) Inventors: Ozcan Ozturk, San Diego, CA (US); Gavin Bernard Horn, La Jolla, CA (US); Gerardo Giaretta, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/717,859

(22) Filed: May 20, 2015

(65) Prior Publication Data
US 2016/0037380 A1 Feb. 4, 2016

Related U.S. Application Data

(60) Provisional application No. 62/031,988, filed on Aug. 1, 2014.

(51) Int. Cl.
*H04W 28/02* (2009.01)
*H04W 48/20* (2009.01)
(Continued)

(52) U.S. Cl.
CPC ......... *H04W 28/0278* (2013.01); *H04L 5/001* (2013.01); *H04W 48/18* (2013.01);
(Continued)

(58) Field of Classification Search
CPC ................ H04L 5/001; H04W 76/026; H04W 28/0278; H04W 88/08; H04W 72/14;
(Continued)

(56) References Cited

U.S. PATENT DOCUMENTS

2006/0040674 A1* 2/2006 Vannithamby ........ H04L 1/0002
455/452.2
2010/0128692 A1* 5/2010 Aiba ..................... H04L 1/0025
370/329

(Continued)

FOREIGN PATENT DOCUMENTS

| EP | 2 884 711 A1 | 6/2015 |
|---|---|---|
| WO | WO-2011/159215 A1 | 12/2011 |
| WO | WO-2014/047942 A1 | 4/2014 |

OTHER PUBLICATIONS

International Search Report and Written Opinion—PCT/US2015/038285—ISA/EPO—dated Sep. 25, 2015. (11 total pages).

*Primary Examiner* — Jianye Wu
(74) *Attorney, Agent, or Firm* — Arent Fox LLP

(57) ABSTRACT

Certain aspects of the described aspects relate to scheduling communications in wireless networks using traffic aggregation. A UE communicates with a first access point using a first RAT over a first connection to access a first wireless network, and with a second access point using a second RAT over a second connection. The UE can receive, from the first access point, one or more parameters for scheduling communications with the second access point. The UE can also schedule communications with the second access point based at least in part on the one or more parameters.

30 Claims, 8 Drawing Sheets

(51) Int. Cl.
*H04W 72/14* (2009.01)
*H04W 72/04* (2009.01)
*H04L 5/00* (2006.01)
*H04W 48/18* (2009.01)
*H04W 76/02* (2009.01)
*H04W 88/08* (2009.01)

(52) U.S. Cl.
CPC ....... *H04W 48/20* (2013.01); *H04W 72/0453* (2013.01); *H04W 72/14* (2013.01); *H04W 76/026* (2013.01); *H04W 88/08* (2013.01)

(58) Field of Classification Search
CPC .. H04W 72/0453; H04W 48/18; H04W 48/20
See application file for complete search history.

(56) References Cited

U.S. PATENT DOCUMENTS

| | | | |
|---|---|---|---|
| 2011/0305220 A1* | 12/2011 | Lindoff | H04W 28/26 370/331 |
| 2012/0069805 A1* | 3/2012 | Feuersanger | H04W 72/1284 370/329 |
| 2012/0120821 A1 | 5/2012 | Kazmi et al. | |
| 2012/0140743 A1* | 6/2012 | Pelletier | H04W 72/0453 370/335 |
| 2013/0028069 A1 | 1/2013 | Pelletier et al. | |
| 2013/0028117 A1* | 1/2013 | Montojo | H04L 5/001 370/252 |
| 2013/0343356 A1* | 12/2013 | Bai | H04W 72/0446 370/336 |
| 2015/0173009 A1* | 6/2015 | Vallath | H04W 48/18 370/329 |

\* cited by examiner

TECHNIQUES FOR SCHEDULING COMMUNICATIONS IN WIRELESS NETWORKS WITH TRAFFIC AGGREGATION

CLAIM OF PRIORITY UNDER 35 U.S.C. §119

The present Application for Patent claims priority to Provisional Application No. 62/031,988 entitled "TECHNIQUES FOR SCHEDULING COMMUNICATIONS IN WIRELESS NETWORKS WITH TRAFFIC AGGREGATION" filed Aug. 1, 2014, which is assigned to the assignee hereof and hereby expressly incorporated in its entirety by reference herein.

FIELD OF THE DISCLOSURE

The present disclosure, for example, relates to wireless communications, and more particularly to techniques for scheduling communications in wireless networks with traffic aggregation.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Additionally, UEs can be equipped to communicate in wireless local area networks (WLAN) by accessing one or more hotspots using a wireless communication technology, such as Institute of Electrical and Electronics Engineers (IEEE) 802.11 (WiFi). In this regard, a UE can communicate with a radio access network (RAN) of a wireless wide area network (WWAN) (e.g., a cellular network) along with a RAN of one or more WLANs. The UE can include a transceiver operable for communicating with the RAN of the WWAN (e.g., a long term evolution (LTE), universal telecommunications mobile system (UMTS), or similar transceiver) and another transceiver operable for communicating with the RAN of the WLAN (e.g., a WiFi transceiver). The UE may additionally or alternatively include a single transceiver operable for communicating with both RANs (e.g., WWAN and WLAN). In either case, the UE can aggregate communications over WWAN and WLAN connections at the RAN layer (e.g., at a media access control (MAC), packet data convergence protocol (PDCP) or similar layers, also known as "RAN aggregation") to provide simultaneous access to one or more network nodes, to offload traffic from the WWAN to WLAN or vice versa, and/or the like.

In current implementations of RAN aggregation, an anchor node (e.g., an evolved Node B (eNB) at the WWAN) schedules downlink communications over the WWAN and WLAN connections for a given UE. For uplink communications, however, transmissions over the WLAN are typically not scheduled and occur opportunistically by the UE. This can impact synchronization in the WWAN that implements RAN aggregation over a WLAN connection (e.g., where packets are received out-of-order over the WLAN connection or otherwise not received within an expected receive window due to delay in transmission, or preemptive transmission, of packets over the WLAN connection).

SUMMARY OF THE DISCLOSURE

Aspects of the present disclosure generally relate to wireless communications, and more particularly to techniques for scheduling communications in wireless networks with traffic aggregation. For example, techniques for scheduling communications between wireless devices and access points in radio access network (RAN) aggregation over wireless local area network (WLAN) connections are described herein.

In accordance with an aspect, a wireless device (e.g., user equipment (UE)) may communicate with access points in multiple RANs using different radio access technologies (RAT) and/or network architectures. For example, the wireless device may communicate with an evolved Node B or other component of a RAN for a wireless wide area network (WWAN) or cellular network, an access point or similar component of a RAN for a WLAN, and/or the like, to access one or more networks. In an example, the UE may implement traffic aggregation (e.g., RAN aggregation) for accessing a first network (e.g., WWAN) by using a first RAT with a first access point and a second network (e.g., WLAN) by using a second RAT with a second access point, where the second access point communicates with the first access point to provide traffic aggregation for the UE to the first network. The first and second access points may be a part of or different RANs. This configuration allows for improved connectivity with the first network and/or the second network. Communications by a UE with the second access point of the second network can be scheduled based at least in part on one or more parameters communicated by a first access point of the first network.

In an example, a method for scheduling communications in wireless networks using traffic aggregation is provided. The method includes communicating with a first access point using a first RAT to access a first wireless network, communicating with a second access point using a second RAT to access a second wireless network, receiving, from the first access point, one or more parameters for scheduling communications with the second access point, and configuring communications with the second access point based at least in part on the one or more parameters. The method may also include wherein the one or more parameters include a maximum packet size for communicating with the second access point. The method may further include wherein the one or more parameters include a packet size for communicating with the second access point. Moreover, the method may include transmitting a buffer status report to the first access point, wherein the one or more parameters indicate a differential between the buffer status report and a resource grant received for communicating with the first access point be used in configuring communications with the second access point. The method may also include wherein the one or more parameters include a target or maximum throughput for communicating with the second access point for a duration. Also, the method may include wherein the one or more parameters include one or more additional parameters for calculating resources for achieving the target or maximum throughput, wherein configuring communications with the second access point is based at least in part on the resources.

The method may also include wherein the one or more parameters include a ratio between resources of a resource grant received for communicating with the first access point and resources for scheduling communications with the second access point, and wherein configuring communications with the second access point is based at least in part on applying the ratio to resources of the resource grant. Further, the method may include wherein the one or more parameters include a ratio between a determined throughput rate in communicating with the first access point and a throughput rate for scheduling communications with the second access point, and wherein configuring communications with the second access point is based at least in part on applying the ratio to throughput rate in communicating with the first access point. The method may also include wherein the one or more parameters include a ratio of buffered data to communicate with the second access point, and wherein configuring communications with the second access point comprises applying the ratio to an amount of data in a buffer for communicating in the first wireless network. Further, the method may include transmitting, to the first access point, a request for communicating using an amount of resources with the second access point, wherein the one or more parameters include a response to the request. The method may also include wherein the one or more parameters correspond to communicating with the second access point over one or more component carriers, one or more logical channels, or one or more logical channel groups. The method may also include wherein the first RAT is a wireless wide area network technology and the second RAT is a wireless local area network technology.

The method may additionally include transmitting feedback information regarding communicating with the second access point to the first access point, wherein the one or more parameters are based at least in part on the feedback information. The method may also include wherein the feedback information includes at least one of channel conditions with the second access point, a modulation and coding scheme, a data rate, or a measure of channel interference. Further, the method may include wherein receiving the one or more parameters comprises receiving one or more validation parameters specifying at least one of a start time, a stop time, a duration, or an interval for using the one or more parameters in configuring communications with the second access point. Additionally, the method may include wherein communicating with a second access point comprises accessing the first wireless network via the second wireless network to implement traffic aggregation.

In another example, an apparatus for scheduling communications in wireless networks using traffic aggregation is provided. The apparatus includes a communicating component configured to communicate with a first access point using a first RAT over a first connection to access a first wireless network, and to communicate with a second access point using a second RAT over a second connection, wherein the second connection is configured by the first access point to implement traffic aggregation with the first connection, a scheduling parameter receiving component configured to receive, from the first access point, one or more parameters for scheduling communications with the second access point, and a communication scheduling component configured to schedule communications with the second access point based at least in part on the one or more parameters.

The apparatus may further include wherein the one or more parameters include a maximum packet size or a packet size for communicating with the second access point. Also, the apparatus may include wherein the communicating component is further configured to transmit a buffer status report to the first access point, wherein the one or more parameters indicate a differential between the buffer status report and a resource grant received for communicating with the first access point be used in configuring communications with the second access point. The apparatus may also include wherein the one or more parameters include a target or maximum throughput for communicating with the second access point for a duration. In addition, the apparatus may include wherein the one or more parameters include a ratio between resources of a resource grant received for communicating with the first access point and resources for scheduling communications with the second access point, and wherein the communication scheduling component is configured to configure communications with the second access point based at least in part on applying the ratio to resources of the resource grant. The apparatus may also include wherein the one or more parameters include a ratio between a determined throughput rate in communicating with the first access point and a throughput rate for scheduling communications with the second access point, and wherein the communication scheduling component is configured to configure communications with the second access point based at least in part on applying the ratio to throughput rate in communicating with the first access point.

The apparatus may additionally include wherein the one or more parameters include a ratio of buffered data to communicate with the second access point, and wherein the communication scheduling component is configured to apply the ratio to an amount of data in a buffer for communicating in the first wireless network. Further, the apparatus may include a scheduling parameter requesting component configured to transmit, to the first access point, a request for communicating using an amount of resources with the second access point, wherein the one or more parameters include a response to the request. The apparatus may also include wherein the one or more parameters correspond to communicating with the second access point over one or more component carriers, one or more logical channels, or one or more logical channel groups. Moreover, the apparatus may include wherein the communicating component is further configured to transmit feedback information regarding communicating with the second access point to the first access point, wherein the one or more parameters are based at least in part on the feedback information. The apparatus may also include wherein the communicating component is configured to receive one or more validation parameters specifying at least one of a start time, a stop time, a duration, or an interval for using the one or more parameters in configuring communications with the second access point.

In yet another example, an apparatus for scheduling communications in wireless networks using traffic aggregation is provided. The apparatus may include means for communicating with a first access point using a first RAT over a first connection to access a first wireless network, and communicating with a second access point using a second RAT over a second connection, wherein the second connection is configured by the first access point to implement traffic aggregation with the first connection, means for receiving, from the first access point, one or more parameters for scheduling communications with the second access point, and means for scheduling communications with the second access point based at least in part on the one or more parameters. The apparatus may also include wherein the one or more parameters include a maximum packet size or a packet size for communicating with the second access point.

Still in another example a computer-readable storage medium comprising computer-executable code for scheduling communications in wireless networks using traffic aggregation is provided. The code includes code for causing at least one computer to communicate with a first access point using a first RAT over a first connection to access a first wireless network, and to communicate with a second access point using a second RAT over a second connection, wherein the second connection is configured by the first access point to implement traffic aggregation with the first connection, code for causing the at least one computer to receive, from the first access point, one or more parameters for scheduling communications with the second access point, and code for causing the at least one computer to schedule communications with the second access point based at least in part on the one or more parameters Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure described herein, but are intended to be illustrative only.

DETAILED DESCRIPTION

Figure 1:
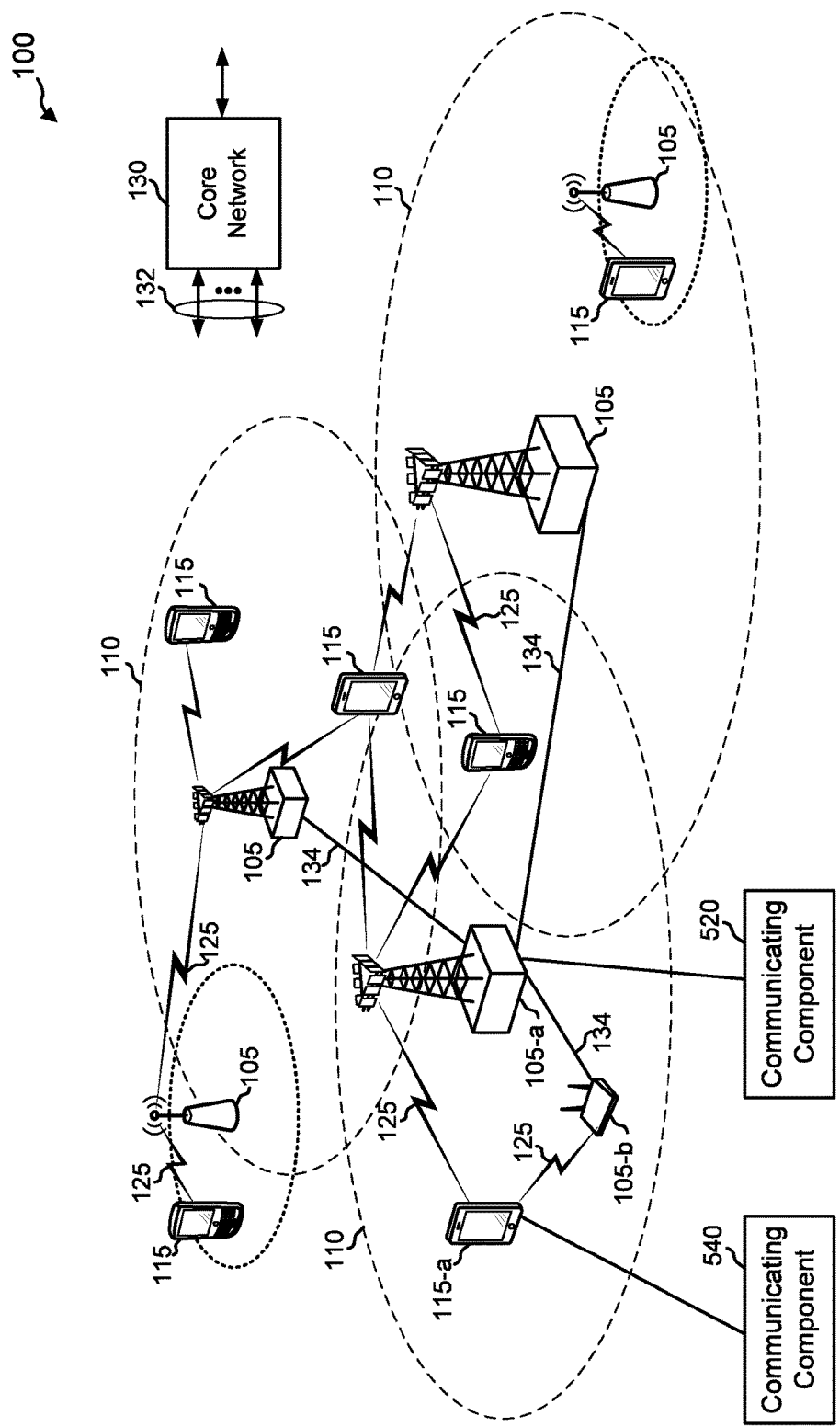
FIG. 1 is a block diagram conceptually illustrating an example of a wireless communications system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various techniques for scheduling communications in wireless networks with traffic aggregation may are described. For example, a wireless device (e.g., user equipment (UE)) can communicate with a first access point using a first RAT to access a first wireless network, and can communicate with a second access point using a second RAT to access a second wireless network. The second access point of the second network may be configured to provide traffic aggregation to the first network via the first access point. Traffic aggregation, as described herein, can include utilizing one or more connections with the first access point and one or more connections with the second access point to access a single wireless network. In one example of traffic aggregation, the second access point can forward or otherwise communicate data received from the UE to the first access point or otherwise to the first wireless network related to the first access point, such that the first wireless network receives aggregated communications from the first access point and the second access point. Thus, the UE can utilize two connections and possibly two transceivers to communicate data to the first wireless network (e.g., over respective connections with the first and second access points) to increase bandwidth utilized for communication, to provide transmit diversity using the two transceivers, etc. Similarly, in an example of traffic aggregation, the second access point can forward or otherwise communicate data received from the first access point or otherwise from the first network to the UE, such that the UE receives aggregated communications from the first wireless network via the first and second access points.

For example, traffic aggregation can also be referred to as "RAN aggregation" such that the second access point, which may be a part of a different radio access network (RAN) than the first access point, can enable communication between the first network and a wireless device along with the first access point at the RAN layer. In this regard, the wireless device can connect to the first access point and the second access point, using the first and second RATs respectively, at the RAN provided by the first access point and second access point, but can do so to access the first wireless network. In this regard, the wireless device can be provisioned with parameters by a first access point for managing the communications via the second access point using the second RAT to achieve traffic aggregation. In some examples, RAN aggregation can be provided at a radio link control (RLC) layer or at a packet data convergence protocol (PDCP) layer. In addition, the first and second access point may be collocated or not collocated.

For example, one or more parameters for scheduling communications with the second access point can be communicated to the UE by the first access point. For instance, the first access point may communicate a scheduling grant to the UE for communicating with the first access point and one or more additional parameters for communicating with the second access point in RAN aggregation. For example, the one or more additional parameters can include at least one of a maximum packet size for communicating with the second access point, a specific packet size for communicating with the second access point, a differential of data packet size between a buffer status report communicated by the UE and a received grant for communicating with the first access point, a target or maximum throughput for communicating with the second access point for a specific duration, a ratio between resources of a grant for communicating with the first access point and resources for scheduling communications with the second access point, a ratio between a throughput rate in communicating with the first access point and a throughput rate for scheduling communications with the second access point, a ratio of buffered data to communicate with the second access point, a response to a UE request for communicating an amount of data with the second access point, etc., as described further herein. In addition, for example, communications can be scheduled with the second access point based at least in part on a type of the communications, one or more component carriers for the communications, one or more channels related to the communications, etc., and the first access point may specify parameters specifically for a type of communications, component carriers used for the communications, channels used for the communications, etc.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. One or more base stations 105 may include a communicating component 520, as described herein, for scheduling communications for one or more UEs 115 to communicate with base station 105 and/or with another access point (e.g., base station 105-b) using traffic aggregation. One or more UEs 115 may include a communicating component 540 for receiving one or more parameters from one or more base stations 105 to communicate with the one or more base stations 105 and one or more other base stations (e.g., base station 105-b) using traffic aggregation, as described further herein. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies. In general, base stations 105-a may be base stations corresponding to a WWAN (e.g., LTE or UMTS macro cell, pico cell, femto cell, etc. base stations), and base stations 105-b may be base stations corresponding to a WLAN (e.g., Institute of Electrical and Electronics Engineers (IEEE) 802.11 (WiFi) hotspot). It is to be appreciated, however, that a single base station 105 can support communications over multiple RATs (e.g., LTE and WiFi, LTE and UMTS, UMTS and WiFi, etc.).

In implementations, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may also cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) with two or more eNodeBs 105. The eNodeBs 105 that are used for carrier aggregation may be collocated or may be connected through fast connections. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects.

In addition, for example, some base stations 105 can support traffic aggregation such that base stations using different RATs can communicate to aggregate traffic from both base stations (e.g., for a given UE 115). For example, UE 115-a can communicate with base station 105-a and base station 105-b, and base station 105-b can communicate with base station 105-a (e.g., over a wired or wireless backhaul link 134) to aggregate traffic from UE 115-a to the base station 105-a for communicating to a related WWAN. Thus, in one example, UE 115-a may support LTE and WiFi communications using one or more transceivers. In this regard, for example, traffic aggregation can be established for the UE 115-a such that UE 115-a communicates data for a first wireless network to base station 105-a and base station 105-b, which operate different RANs, using respective RATs. Base station 105-b can provide the data to base station 105-a for communicating in the related first wireless network. This configuration allows for increased throughput or other improved connectivity properties for the UE 115-a.

In addition, communications between a UE 115-a and a base station 105-a can be scheduled, and aspects described herein provide for also scheduling communications between UE 115-a and base station 105-b, though the RAT of 105-b may be a WLAN RAT or another RAT that does not require scheduling or otherwise supports opportunistic communication by the UE 115-a. Scheduling of communications between the UE 115-a and base station 105-b by the base station 105-a, as described in detail herein, can allow base station 105-a to control communications from the UE 115-a to both of base stations 105-a and 105-b. This can facilitate managing an amount of access provided to the UE 115-a by base station 105-b, which can assist in receiving and decoding data received from a UE 115 over multiple communication links 125 from multiple base stations 105.

Figure 2:
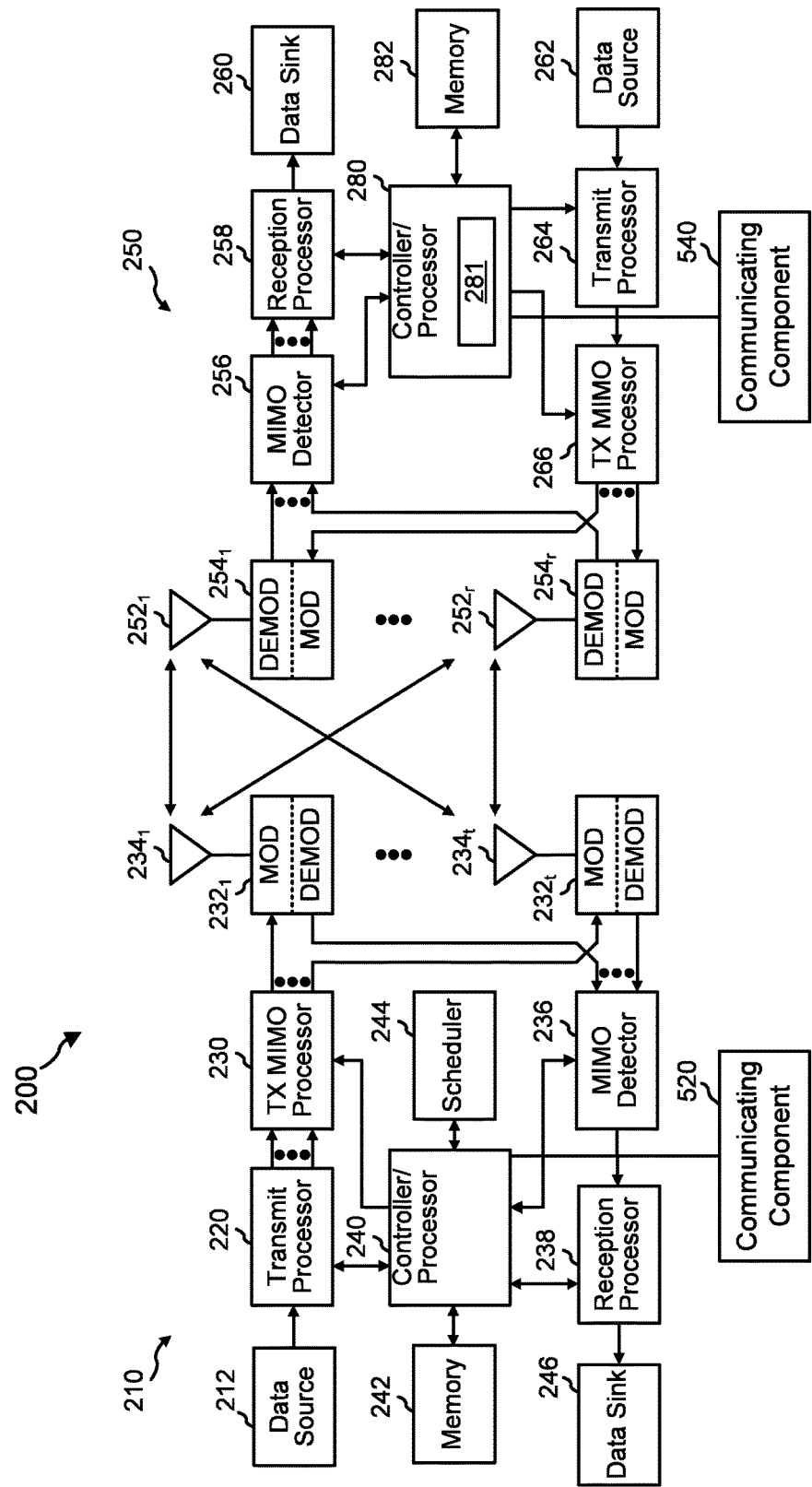
FIG. 2 is a block diagram conceptually illustrating examples of an eNodeB and a UE configured in accordance with various aspects of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. Thus, for example, base station 210 may include a communicating component 520, as described herein, for scheduling communications for one or more UEs 250 to communicate with the base station 210 and/or with another access point using traffic aggregation. UE 250 may include a communicating component 540 for receiving one or more parameters from one or more base stations 210 to communicate with the one or more base stations 210 and one or more other base stations using traffic aggregation, as described further herein. In some aspects, the eNodeB 210 may support traffic aggregation, as described herein. In some aspects, the UE 250 may also support traffic aggregation. The UE 250 may receive configuration information for traffic aggregation from eNodeB 210 or other network entities. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/processor 240. The control information may be carried on the PBCH, PCFICH, physical hybrid automatic repeat/request (HARQ) indicator channel (PHICH), PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulator $254_{1-r}$ (e.g., for SC-FDM, etc.), and transmitted to the base station 210. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 238 may provide the decoded data to a base station data sink 246 and the decoded control information to the base station controller/processor 240.

The base station controller/processor 240 and the UE controller/processor 280 may direct the operation at the base station 210 and the UE 250, respectively. The UE controller/processor 280 and/or other processors and modules at the UE 250 may also perform or direct, e.g., the execution of the functional blocks illustrated in FIG. 5, and/or other processes for the techniques described herein (e.g., flowcharts illustrated in FIG. 6 and FIG. 7). In some aspects, at least a portion of the execution of these functional blocks and/or processes may be performed by block 281 in the UE controller/processor 280. The base station memory 242 and the UE memory 282 may store data and program codes for the base station 210 and the UE 250, respectively. For example, the UE memory 282 may store configuration information for multiple connectivity wireless communication provided by the base station 210 and/or another base station. A scheduler 244 may be used to schedule UE 250 for data transmission on the downlink and/or uplink.

In one configuration, the UE 250 may include means for communicating with a first access point using a first RAT over a first connection to access a first wireless network. The UE 250 may also include means for communicating with a second access point using a second RAT over a second connection, wherein the second connection is configured by the first access point to implement traffic aggregation with the first connection. The UE 250 may further include means for receiving, from the first access point, one or more parameters for scheduling communications with the second access point. The UE 250 can also include means for communicating with the second access point based at least in part on the one or more parameters. In one aspect, the aforementioned means may be the UE controller/processor 280, the UE memory 282, the UE reception processor 258, the UE MIMO detector 256, the UE modulators/demodulators 254, and/or the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 5.

In one configuration, the base station 210 may include means for communicating with a user equipment (UE) using a first RAT. The base station 210 may also include means for communicating with the UE using traffic aggregation via another access point that uses a second RAT. The base station 210 can further include means for transmitting a scheduling grant to the UE for communicating using the first RAT. Additionally, the base station 210 may include means for transmitting one or more parameters to the UE for scheduling communications using the second RAT. In one aspect, the aforementioned means may be the base station controller/processor 240, the base station memory 242, the base station reception processor 238, the base station MIMO detector 236, the base station modulators/demodulators 232, and/or the base station antennas 234 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 5.

Figure 3:
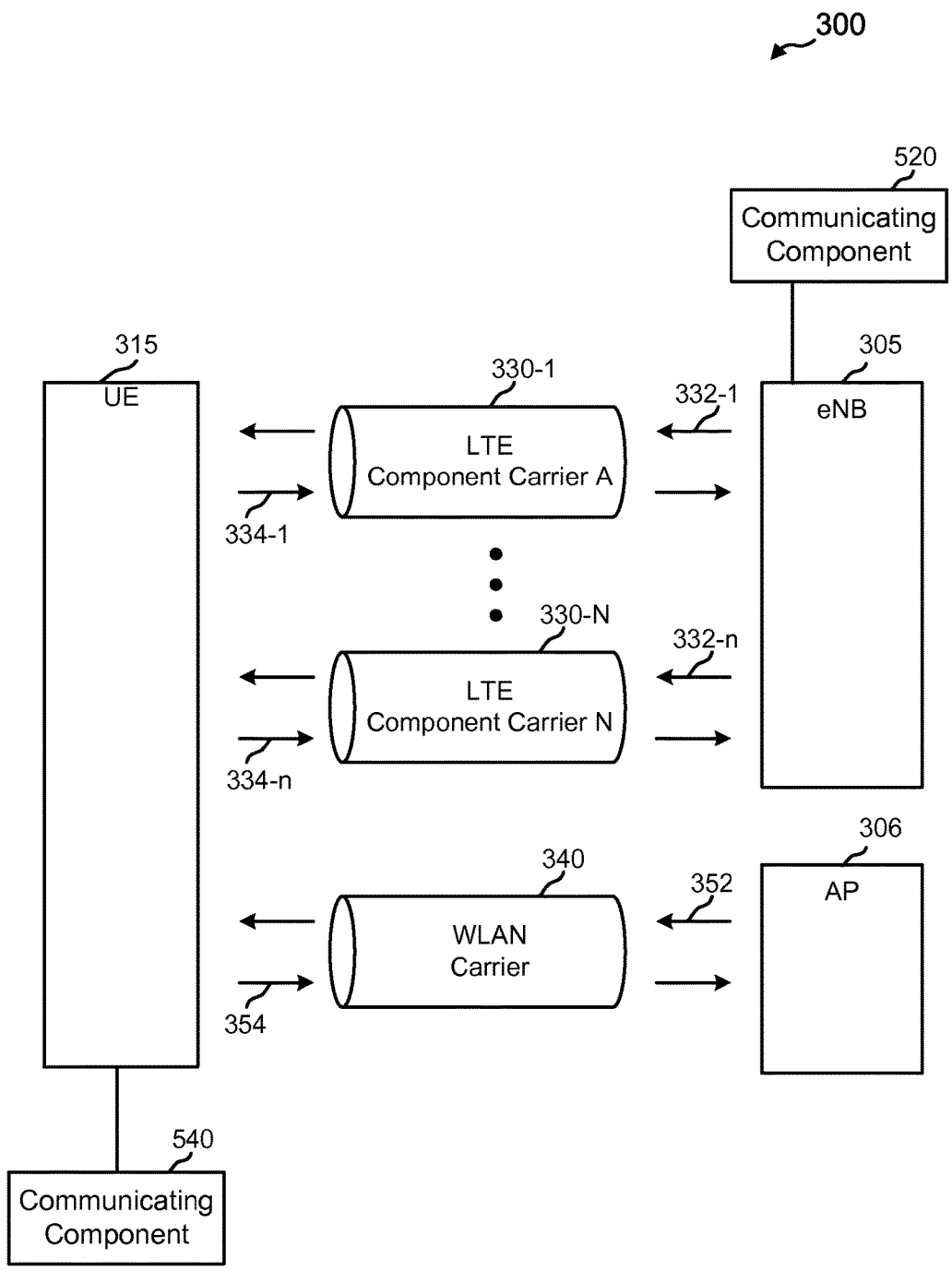
FIG. 3 is a block diagram conceptually illustrating an aggregation of radio access technologies at a UE, in accordance with various aspects of the present disclosure.

FIG. 3 is a block diagram conceptually illustrating an aggregation of radio access technologies at a UE, in accordance with aspects described herein. The aggregation may occur in a system 300 including a multi-mode UE 315, which can communicate with an eNodeB 305 using one or more component carriers 1 through N ($CC_1$-$CC_N$), and/or with a WLAN access point (AP) 306 using WLAN carrier 340. A multi-mode UE in this example may refer to a UE that supports more than one radio access technology (RAT). eNodeB 305 may include a communicating component 520, as described herein, for scheduling communications for one or more UEs 315 to communicate with eNodeB 305 and/or with another access point (e.g., AP 306) using traffic aggregation. UE 315 may include a communicating component 540 for receiving one or more parameters from one or more eNodeBs 305 to communicate with the one or more eNodeBs 305 and one or more other eNodeBs (e.g., AP 306) using traffic aggregation, as described further herein. For example, the UE 315 supports at least a WWAN radio access technology (e.g., LTE) and a WLAN radio access technology (e.g., Wi-Fi). A multi-mode UE may also support carrier aggregation using one or more of the RATs. The UE 315 may be an example of one of the UEs of FIG. 1, FIG. 2, FIG. 4, FIG. 5. The eNodeB 305 may be an example of one of the eNodeBs or eNodeBs of FIG. 1, FIG. 2, FIG. 4, FIG. 5. While only one UE 315, one eNodeB 305, and one AP 306 are illustrated in FIG. 3, it will be appreciated that the system 300 can include any number of UEs 315, eNodeBs 305, and/or APs 306. In one specific example, UE 315 can communicate with one eNodeB 305 over one LTE component carrier 330 while communicating with another eNodeB 305 over another component carrier 330.

The eNodeB 305 can transmit information to the UE 315 over forward (downlink) channels 332-1 through 332-N on LTE component carriers $CC_1$ through $CC_N$ 330. In addition, the UE 315 can transmit information to the eNodeB 305 over reverse (uplink) channels 334-1 through 334-N on LTE component carriers $CC_1$ through $CC_N$. Similarly, the AP 306 may transmit information to the UE 315 over forward (downlink) channel 352 on WLAN carrier 340. In addition, the UE 315 may transmit information to the AP 306 over reverse (uplink) channel 354 of WLAN carrier 340.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 315 may receive data from one eNodeB 305. However, users on a cell edge may experience high inter-cell interference which may limit the data rates. Multiflow allows UEs to receive data from two eNodeBs 305 simultaneously. In some aspects, the two eNodeBs 305 may be non-collocated and may be configured to support carrier aggregation. Multiflow works by sending and receiving data from the two eNodeBs 305 in two totally separate streams when a UE is in range of two cell towers in two adjacent cells at the same time. The UE talks to two eNodeB 305 simultaneously when the device is on the edge of either eNodeBs' reach. By scheduling two independent data streams to the mobile device from two different eNodeBs at the same time, multiflow exploits uneven loading in HSPA networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated.

Figure 4:
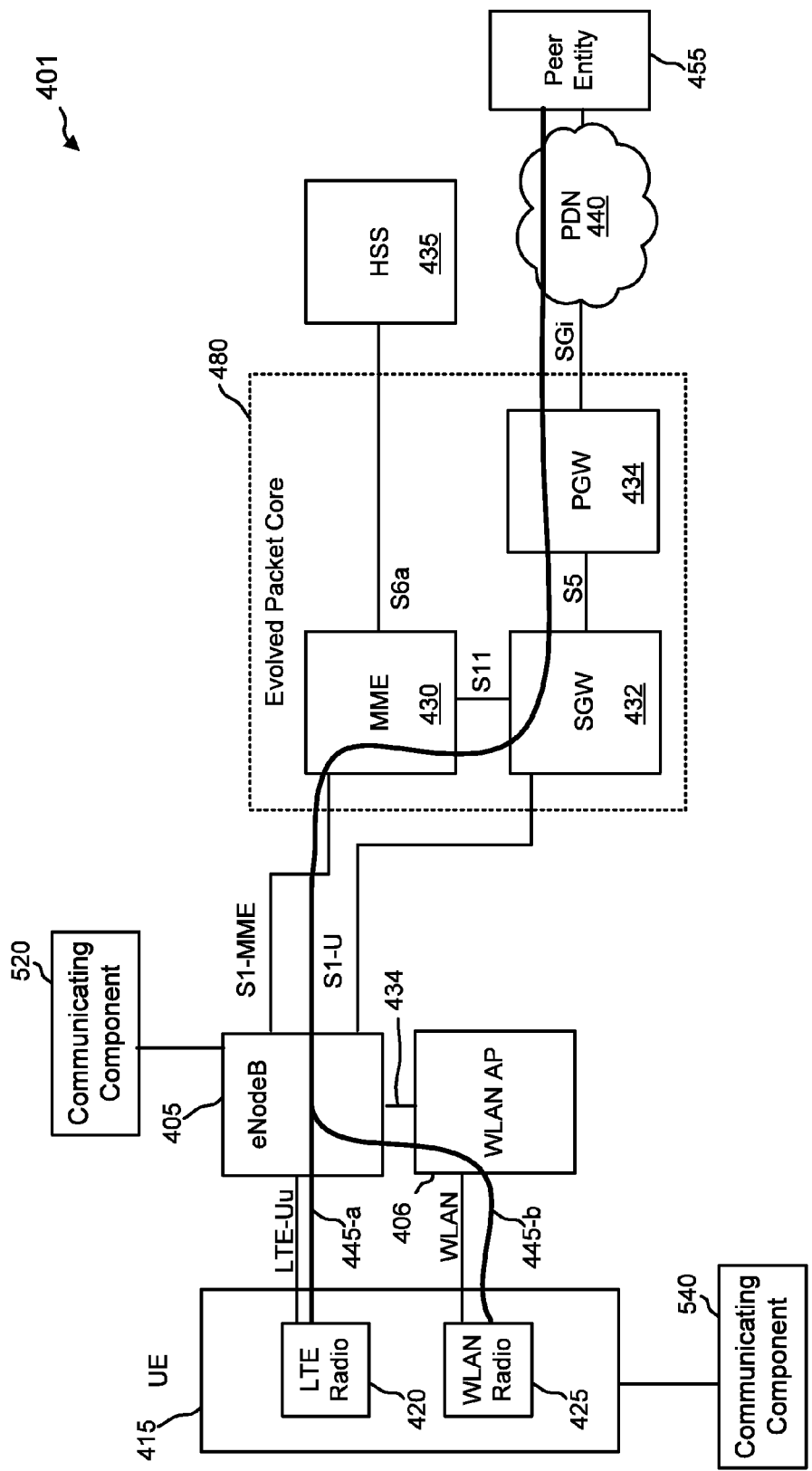
FIG. 4 is a block diagram conceptually illustrating an example of data paths between a UE and a PDN in accordance with various aspects of the present disclosure.

FIG. 4 is a block diagram conceptually illustrating an example of data paths 445-*a* and 445-*b* between the UE 415 and the EPC 480 in accordance with an aspect of the aspects described herein. The data paths 445-*a*, 445-*b* are shown within the context of a wireless communications system 401 for aggregating traffic for transmitting using resources of eNodeBs 405 and WLAN AP 406. This bearer configuration includes data path 445-*a* that traverses eNodeB 405, and a data path 445-*b* that traverses WLAN AP 406 and eNodeB 405 in RAN aggregation. The system 200 of FIG. 2 may be an example of portions of the wireless communications system 401. The wireless communications system 401 may include a UE 415, eNodeB 405, WLAN AP 406, an evolved packet core (EPC) 480, a PDN 440, and a peer entity 455. The UE 415 may be configured to support traffic aggregation, as described herein, though the traffic aggregation can be controlled by eNodeB 405 and may be agnostic to upper layers of the UE 415. eNodeB 405 may include a communicating component 520, as described herein, for scheduling communications for one or more UEs 415 to communicate with eNodeB 405 and/or with another access point (e.g., WLAN AP 406) using traffic aggregation. One or more UEs 415 may include a communicating component 540 for receiving one or more parameters from one or more eNodeBs 405 to communicate with the one or more eNodeBs 405 and one or more other base stations (e.g., WLAN AP 406) using traffic aggregation, as described further herein.

The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and a WLAN radio 425. It is to be appreciated that the UE 415 can include one or more such radios and/or the radios may be integrated. Thus, in an example, LTE radio 420 can also include a WLAN radio (or can be configured to process WLAN signals) in addition to the WLAN radio 425, and in this example, UE 415 includes two WLAN interfaces—one in the LTE radio 420 and one in the WLAN radio 425. These elements may represent aspects of one or more of their counterparts described above with reference to the previous or subsequent Figures. For example, the UE 415 may be an example of UEs in FIG. 1, FIG. 2, FIG. 3, FIG. 5, the eNodeB 405-*a* may be an example of the eNodeBs/base stations of FIG. 1, FIG. 2, FIG. 3, FIG. 5, WLAN AP 406 may be an example of the APs described in FIG. 1, FIG. 3, FIG. 5, and/or the EPC 480 may be an example of the core network of FIG. 1.

Referring back to FIG. 4, the eNodeB 405-*a* may be capable of providing the UE 415 with access to the PDN 440, which may relate to one or more LTE component carriers, as described. WLAN AP 406 may be capable of providing the UE 415 with access to the PDN 440 by traversing the eNodeB 405. Thus, eNodeB 405 and WLAN AP 406 can communicate to aggregate traffic from UE 415. Accordingly, the UE 415 may involve traffic aggregation where one connection is to a first access point (eNodeB 405) and the other connection is to a second access point (WLAN AP 406), where the second access point communicates with the first access point to aggregate traffic for the UE 415. Using this configuration, bearers established for the UE 415 with EPC 480 can be with the eNodeB 405 and/or the WLAN AP 406. In one example, bearer selection can be configured where the UE 415 has separate bearers established between the EPC 408 and the eNodeB 405 and between the EPC 480 and the WLAN AP 406 (via eNodeB 405). In this example, data traffic (e.g., IP packets) is sent over respective bearers, which can map to carriers between the UE 415 and eNodeB 405/WLAN AP 406. In another example, RLC/PDCP level aggregation can be configured where the UE 415 bearers are between the eNodeB 405 EPC 480 even for the WLAN AP 406 carriers. In this example, data traffic (e.g., IP packets) is aggregated at the RLC/PDCP level and communicated to UE 415 or respective carriers with the eNodeB 405 and WLAN AP 406. In addition, for example, eNodeB 405 and WLAN AP 406 may communicate over a backhaul link 434 to coordinate providing communication resources to the UE 415, receiving communications from the UE 415, etc.

While aspects of FIG. 4 have been described with respect to LTE, similar aspects regarding aggregation and/or multiple connections may also be implemented with respect to UMTS or other similar system or network wireless communications radio technologies.

Figure 5:
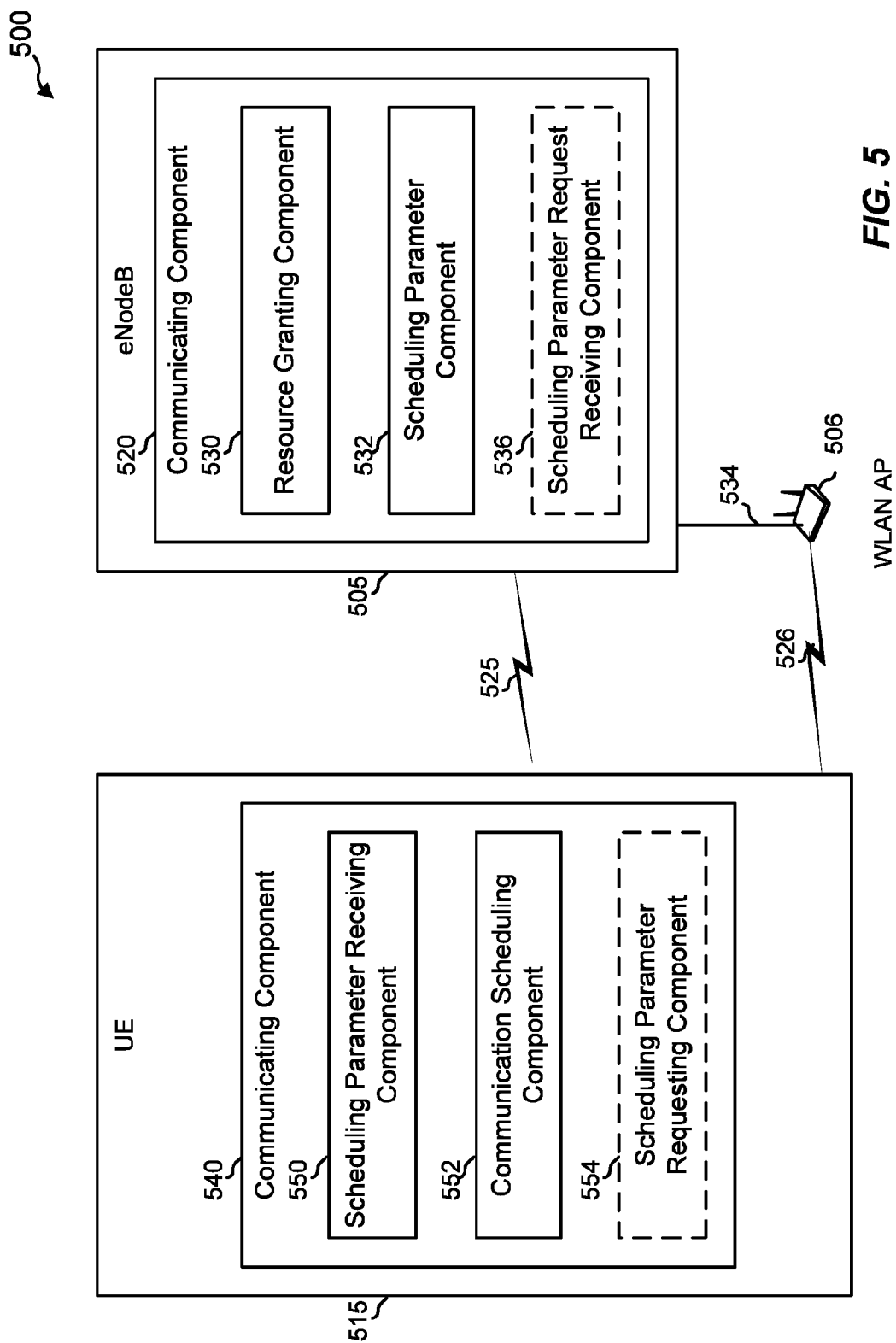
FIG. 5 is a block diagram conceptually illustrating an example of a UE and eNodeB, along with respective components configured in accordance with various aspects of the present disclosure.
Figure 6:
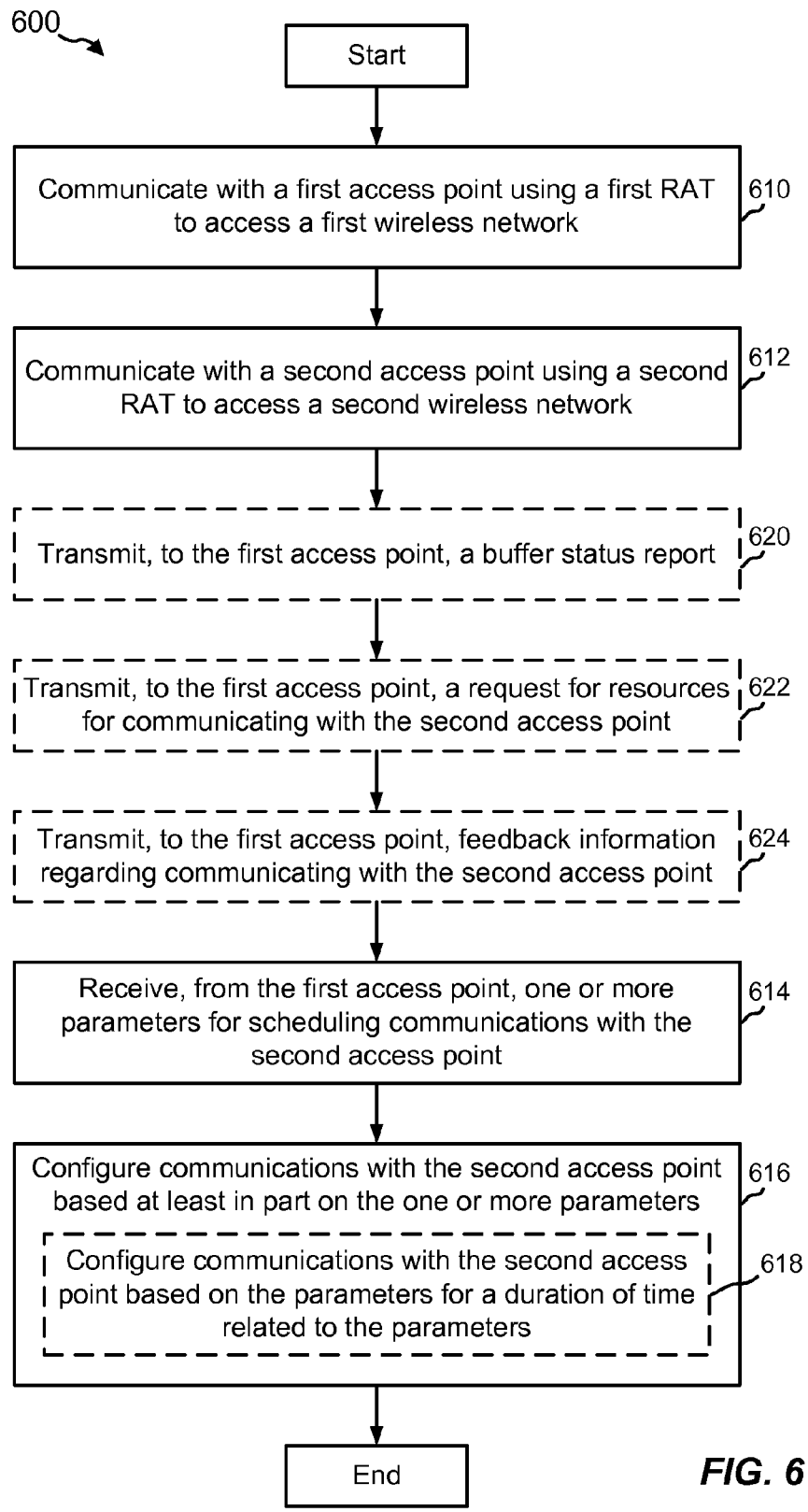
FIG. 6 is a flowchart illustrating a method for scheduling communications in accordance with various aspects of the present disclosure.
Figure 7:
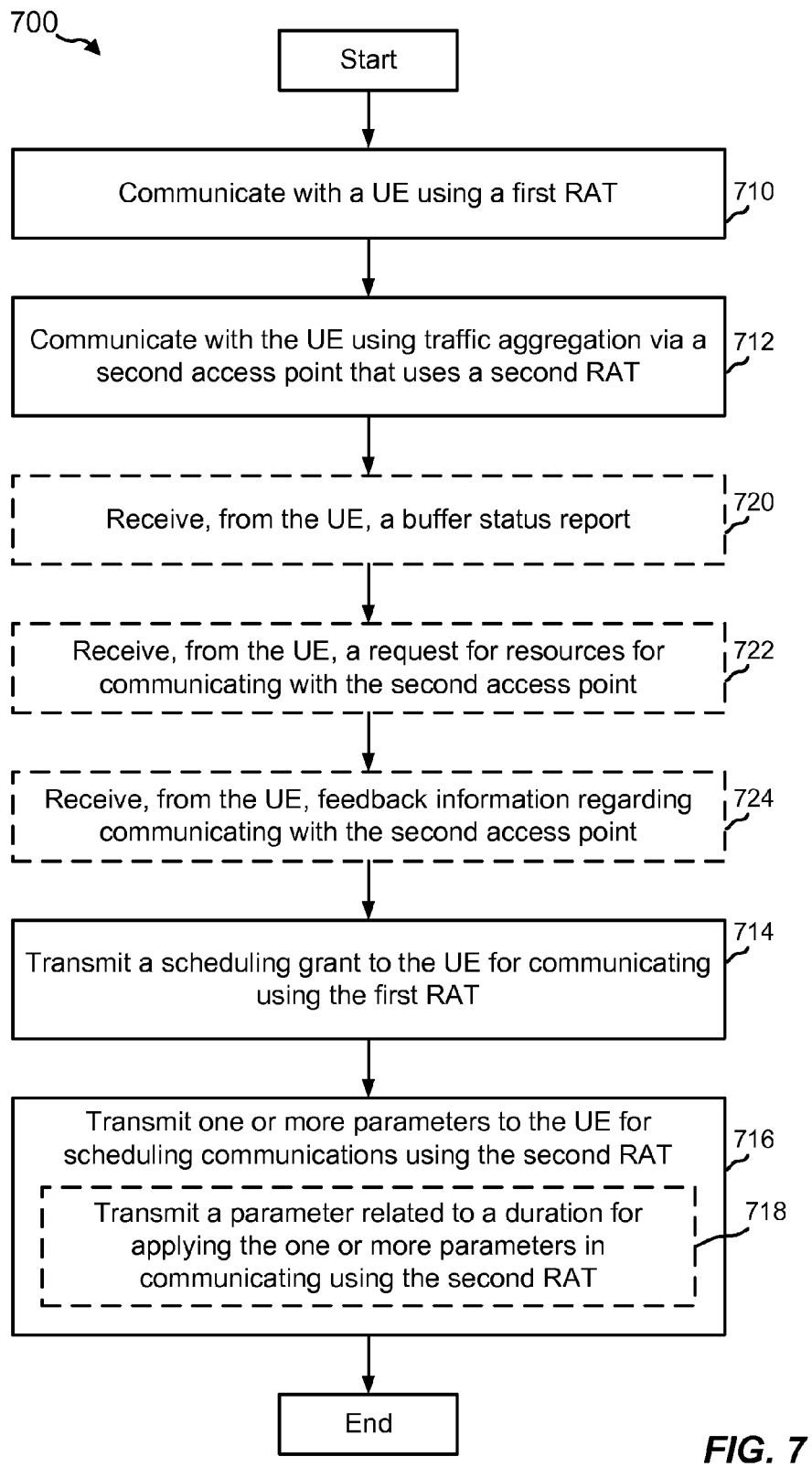
FIG. 7 is a flowchart illustrating a method for scheduling communications in accordance with various aspects of the present disclosure.

FIG. 5 is a block diagram 500 conceptually illustrating an example of a UE 515 and components configured in accordance with an aspect of the present disclosure. FIGS. 6 and 7, which are described in conjunction with FIG. 5 herein, illustrate example methods 600 and 700 in accordance with aspects of the present disclosure. Although the operations described below in FIGS. 6 and 7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 5, an eNodeB 505, a WLAN AP 506, and the UE 515 of block diagram 500 may be one of the base stations/eNodeBs, APs, and/or UEs as described in various Figures herein. The eNodeB 505 and the UE 515 may communicate over first communication link 525. The WLAN AP 506 and the UE 515 may communicate over second communication link 526. Each of the communication links 525, 526 may be an example of the communication links 125 of FIG. 1. In addition, for example, eNodeB 505 can communicate with WLAN AP 506 over a backhaul link 534, which may be a link directly between the eNodeB 505 and WLAN AP 506, a link that traverses one or more network nodes of a core network related to eNodeB 505 and/or a network of WLAN AP 506, etc. eNodeB 505 can communicate with WLAN AP 506, for example, to configure and provide traffic aggregation (e.g., RAN aggregation) for the UE 515, such that traffic can be communicated between UE 515 and a network related to eNodeB 505 by using both radio access via the eNodeB 505 and radio access via WLAN AP 506 (e.g., where the WLAN AP 506 may receive data from the eNodeB 505 for communicating to the UE 515 and/or may receive data from the UE 515 for communicating to the network related to eNodeB 505).

For example, the eNodeB 505 can include a communicating component 520 for communicating with a UE 515 over first communication link 525 and using traffic aggregation via WLAN AP 506 over second communication link 526. For example, communicating component 520 can include, or can be in communication with, a resource granting component 530 for scheduling and/or granting resources to UE 515 for communicating with eNodeB 505 over first communication link 525, a scheduling parameter component 532 for generating and transmitting one or more parameters for scheduling, granting, or otherwise indicating parameters for determining resources for communications between UE 515 and WLAN AP 506 over second communication link 526 as well, and/or an optional scheduling parameter request receiving component 536 for receiving a request for scheduling parameters from UE 515 for communicating over the second communication link 526.

Moreover, for example, UE 515 can be provisioned to implement traffic aggregation over communication links 525 and 526 (and/or additional communication links between eNodeB 505 and UE 515 and/or between WLAN AP 506 and UE) by the eNodeB 505. For example, UE 515 can include a communicating component 540 for receiving a traffic aggregation configuration specifying to communicate with both eNodeB 505 using a related transceiver (e.g., LTE/UMTS radio) and with WLAN AP 506 using a related transceiver (e.g., WiFi radio) to access a WWAN or cellular network. As described, traffic aggregation can be configured and implemented to allow communications at lower layers of the UE 515 (e.g., PHY/MAC layer or RLC/PDCP layer) using different RANs to be aggregated by higher layers (e.g., PDCP or Internet protocol (IP) layer), such that a high level operating system (HLOS), applications operating on the HLOS, a user interface, etc. may be agnostic to the presence of traffic aggregation.

Communicating component 540 can include, or can be in communication with, a scheduling parameter receiving component 550 for receiving one or more parameters from an anchor node, such as eNodeB 505 or WLAN AP 506, for communicating with one or more eNodeBs or WLAN APs using traffic aggregation, a communication scheduling component 552 for scheduling communications over a first communication link 525 with an eNodeB 505 and a second communication link 526 with a WLAN AP 506 based at least in part on the one or more parameters from the anchor node, and/or an optional scheduling parameter requesting component 554 for requesting one or more scheduling parameters from the anchor node for communicating over communication links 525 and/or 526 to facilitate traffic aggregation over the links, related CCs, bearers, etc. In any case, communicating component 520 can be configured to transmit communications for receipt by communicating component 540 over first communication link 525 and over second communication link 526 via WLAN AP 506, in this regard. Similarly, as described further herein, communicating component 520 can configure communicating component 540 to transmit communications to eNodeB 505 over first communication link 525 and via WLAN AP 506 over second communication link 526.

It is to be appreciated that communicating components 520 and/or 540, and/or components thereof, may include or may be implemented by one or more components of a device (e.g., a UE 902, eNB 904, etc.) to facilitate wired or wireless communication of data between devices. For example, communicating components 520 and/or 540 may include or may be implemented as hardware, a computer-readable medium executed by a processor, etc. on a device. In one specific example, communicating components 520 and/or 540 may include or may be implemented by at least one of a TX processor 220, 264 to transmit signals over antennas 234, 252, a RX processor 238, 258 to receive signals over antennas 234, 252, a controller/processor 240, 280 to execute one or more functions described herein, etc.

Referring to FIG. 6, method 600 includes, at Block 610, communicating with a first access point using a first RAT to access a first wireless network. Communicating component 540 can communicate with the first access point (e.g., eNodeB 505) using the first RAT (e.g., LTE, UMTS, etc.) to access the first wireless network (e.g., using first communication link 525). As described, communicating component 540 can include or can otherwise be in communication with a transceiver to communicate with the eNodeB 505 using the first RAT. Method 600 also includes, at Block 612, communicating with a second access point using a second RAT to access a second wireless network. Thus, communicating component 540 can communicate with the second access point (e.g., WLAN AP 506) using the second RAT (e.g., WiFi) to access the second wireless network (e.g., using second communication link 526). As described, communicating component 540 can include or can otherwise be in communication with another transceiver to communicate with the WLAN AP 506 using the second RAT. In one example, eNodeB 505 can configure traffic aggregation for UE 515 such that UE 515 communicates with both eNodeB 505 and WLAN AP 506 over respective first communication link 525 and second communication link 526 to access a network related to the eNodeB 505. In this regard, as described, WLAN AP 506 can communicate UE 515 traffic with the eNodeB 505 to provide the traffic aggregation for the UE 515 via second communication link 526.

As described, providing traffic aggregation in this regard can improve efficiency in communications of the UE 515, provide connection diversity using the multiple links, etc. Moreover, the RAN connection between UE 515 and WLAN AP 506 may be opportunistic (e.g., not based on a schedule), and thus may allow the UE 515 to determine an amount of data to transmit once the UE seizes the channel with the WLAN AP 506. This adds complexity to coordinating communications over communication links 525 and 526. Thus, as described further herein, eNodeB 505 can manage aspects of the connection between UE 515 and WLAN AP 506 to allow improved coordination over the communication links 525 and 526.

Accordingly, method 600 includes, at Block 614, receiving, from the first access point, one or more parameters for scheduling communications with the second access point. Scheduling parameter receiving component 550 can receive, from the first access point (e.g., eNodeB 505), the one or more parameters for scheduling communications with the second access point (e.g., WLAN AP 506). Method 600 also includes, at Block 616, configuring communications with the second access point based at least in part on the one or more parameters. Communication scheduling component 552 can configure communications with the second access point (e.g., WLAN AP 506) based at least in part on the one or more parameters. For example, communication scheduling component 552 can configure the communications after second communication link 526 is initialized and/or at any time during active communications over one or more carriers of the second communication link 526 (e.g., based on receiving the one or more parameters from eNodeB 505).

Referring to FIG. 7, method 700 includes, at Block 710, communicating with a UE using a first RAT. eNodeB 505 Communicating component 520 can communicate with the UE (e.g., UE 515) using the first RAT (e.g., the RAT of the eNodeB 505, which may be LTE, UMTS, etc.) over first communication link 525. As described, communicating component 520 can include or can otherwise be in communication with a transceiver to communicate with the UE 515 using the first RAT. Method 700 also includes, at Block 712, communicating with the UE using traffic aggregation via a second access point that uses a second RAT. Thus, communicating component 520 can communicate with the UE 515 using traffic aggregation via a second access point (e.g., WLAN AP 506) that uses the second RAT (e.g., WiFi) over second communication link 526 as the second connection. As described, communicating component 520 can include or can otherwise be in communication with a transceiver to communicate with the WLAN AP 506 over a wired or wireless backhaul link 534. eNodeB 505 can thus configure traffic aggregation for UE 515 such that UE 515 communicates with both eNodeB 505 and WLAN AP 506 to access a network related to the eNodeB 505. In this regard, as described, WLAN AP 506 can communicate UE 515 traffic with the eNodeB 505 to provide the traffic aggregation for the UE 515 via second communication link 526.

Method 700 includes, at Block 714, transmitting a scheduling grant to the UE for communicating using the first RAT. Resource granting component 530 can transmit the scheduling grant to the UE (e.g., UE 515) for communicating using the first RAT (e.g. over first communication link 525). The scheduling grant can schedule first RAT resources to the UE 515 for communicating data to/from eNodeB 505. Method 700 also includes, at Block 716, transmitting one or more parameters to the UE for configuring communications using the second RAT. Scheduling parameter component 532 can transmit the one or more parameters to the UE (e.g., UE 515) for configuring communications using the second RAT (e.g., the RAT of WLAN AP 506 over a second communication link 526). For example, scheduling parameter component 532 can transmit the one or more parameters for configuring the communications over the second communication link 526 (e.g., when the second communication link 526 is initialized and/or at any time during active communications over one or more carriers of the second communication link 526).

For example, the one or more parameters can include a maximum number of resources (e.g., a maximum number of bits/bytes), such as a packet size, that can be used with the second access point (e.g., the WLAN AP 506). In this example, scheduling parameter component 532 can generate and transmit a scheduling parameter that specifies the maximum amount of resources for using over the second communication link 526 (e.g., in one or more periods of time) to the UE 515. In one example, the maximum amount of resources may be based on the scheduling grant provided to the UE 515 by resource granting component 530 for first communication link 525. For example, the maximum amount of resources may be computed as a percentage of the scheduling grant for the first communication link, which can ensure the UE 515 does not transmit too much data over the second communication link 526 such to add complexity to aggregating the traffic over communication links 525 and 526. In any case, scheduling parameter receiving component 550 can receive the maximum amount resources, and communication scheduling component 552 can use the maximum amount of resources in configuring communications with the WLAN AP 506 over second communication link 526 in traffic aggregation such to not exceed the maximum amount of resources. For example, where the maximum amount corresponds to a packet size, communication scheduling component 552 can ensure the packet size of communications over second communication link 526 do not exceed the maximum packet size specified in the one or more parameters.

As described further herein, it is to be appreciated that the one or more parameters may be valid for a specified or configured period of time, intervals of time, etc., after or between which the UE 515 can schedule communications without restriction or based on a configured default parameter value. In this regard, configuring communications at Block 616 may include, at Block 618, configuring communications with the second access point based on the parameters for a duration of time related to the parameters. Communication scheduling component 552 can configure the communications with the second access point (e.g., WLAN AP 506) based on the parameters for the duration of time related to the parameters. The duration of time may correspond to a time specified in configuration parameters from the eNodeB 505, a time that is stored in a memory of UE 515, etc. In addition, the time may correspond to a specific duration after receiving the one or more parameters, an interval based on the one or more parameters, etc., during which the parameters are valid. Transmitting the one or more parameters at Block 716, in this regard, may also include, at Block 718, transmitting a parameter related to a duration for applying the one or more parameters in communicating using the second RAT. Scheduling parameter component 532 can transmit the parameter related to the duration for applying the one or more parameters in communicating using the second RAT. In this example, scheduling parameter receiving component 550 can also receive the parameter related to the duration for applying the one or more parameters, and communication scheduling component 552 can apply the one or more parameter based on the duration. Where a duration is not communicated for the one or more parameters, for example, communication scheduling component 552 can apply the one or more parameters for a default duration, which may be configured to the UE 515 when establishing communications with the eNodeB 505, stored in a memory of UE 515, etc., and/or may apply the one or more parameters until different values for the one or more parameters are received from the eNodeB 505 or another access point. Moreover, in this regard, it is to be appreciated that the eNodeB 505 may configure the UE 515 with the parameters upon establishing communication with the eNodeB 505, upon implementation of traffic aggregation through WLAN AP 506, and/or may periodically update the one or more parameters.

In another example, the one or more parameters can relate to a specific amount of resources (e.g., a number of bits/bytes) for communicating with the WLAN AP 506 over second communication link 526. In this example, scheduling parameter component 532 can signal the specific amount of resources to UE 515, scheduling parameter receiving component 550 can receive the specific amount of resources, and communication scheduling component 552 can configure communications with WLAN AP 506 over second communication link 526 based on the specific amount of resources. For example, communication scheduling component 552 can configure transmissions using the specific amount of resources so as not to exceed the amount in scheduling communications over the second communication link 526. In addition, in an example where data to transmit is not sufficient to utilize the entire amount of resources, communication scheduling component 552 may configure the transmission to include the data and may pad a remaining portion of an amount of resources (e.g., with zeros, random data, etc.) to utilize the whole amount of resources. In addition, in this regard, resource granting component 530 may grant resources for first communication link 525 based on the specific grant (e.g., for a larger specific amount of resources indicated for second communication link 526, resource granting component 530 may schedule a smaller grant for first communication link 525 to conserve WWAN resources over the first communication link 525).

In yet another example, the one or more parameters may relate to a differential between a reported buffer status by the UE 515 and the scheduling grant from resource granting component 530. Thus, for example, method 600 may include, at Block 620, transmitting, to the first access point, a buffer status report. Communicating component 540 can transmit, to the first access point (e.g., eNodeB 505) the buffer status report. For example, the buffer status report can indicate a size of a buffer for packet data communications at the UE 515 such that the eNodeB 505 can determine a scheduling grant for the UE 515 based on the buffer size (e.g., a larger grant when the buffer is of a larger size to allow the UE 515 to communicate additional data in a next transmission). Similarly, method 700 can include, at Block 720, receiving, from the UE, a buffer status report. Communicating component 520 can receive, from the UE (e.g., UE 515), the buffer status report. In this example, resource granting component 530 may indicate a grant of resources based on the buffer status report that may not allow for transmission of all data in the buffer, and may grant the resources to UE 515. In this example, scheduling parameter receiving component 550 can determine an amount of resources for the second communication link 526 based at least in part on the differential between the reported buffer status and the grant received from eNodeB 505. Accordingly, communication scheduling component 552 can configure communication of data from the buffer as reported in the buffer status report over first communication link 525 over the first communication link 525, and may configure communication of additional data from the buffer over the second communication link 526 based on the differential. In this example, communication scheduling component 552 can determine the buffer status based on the buffer status report communicated by communicating component 540 to eNodeB 505. Communication scheduling component 552 can then also configure the remainder of the buffer on second communication link 526. In this regard, UE 515 can transmit on first communication link 525 first, and then up to the differential on second communication link 526. Moreover, if additional packets arrive for sending after communicating component 540 sends the buffer status report to the eNodeB 505 (e.g., and before sending another buffer status report), communication scheduling component 552 can additionally configure these packets for transmission over second communication link 526.

In another example, the one or more parameters may relate to a target or maximum throughput (e.g., bits per second) for second communication link 526. Associated parameters for calculating the throughput can also be signaled by scheduling parameter component 532 to the UE 515 or otherwise known by UE 515. For example, the one or more parameters may specify the maximum throughput as applicable for a duration or until another throughput is received, as described above. In either case, scheduling parameter component 532 can transmit the target maximum throughput to UE 515, scheduling parameter receiving component 550 can receive the target maximum throughput, and communication scheduling component 552 can configure communications over second communication link 526 to ensure that communications do not exceed the maximum throughput.

In this example, communication scheduling component 552 can measure throughput of communications with WLAN AP 506 over second communication link 526 to determine an achieved throughput using one or more throughput calculation parameters (e.g., filtering coefficients, parameters specifying how often to update the calculated throughput, parameters related to determining the throughput in a sliding window of observation, etc.). Communication scheduling component 552 can accordingly configure more or less data on second communication link 526 in subsequent transmissions to adhere to the maximum throughput. For example, parameters related to throughput calculation (e.g., filtering coefficients, an interval after which to update the throughput, a size of a sliding window to observe in calculating the throughput, etc.) can also be received in the one or more parameters from scheduling parameter component 532, can be default parameters configured by UE 515 (e.g., based on a configuration when establishing communications with eNodeB 505, stored in a memory of UE 515, and/or the like), etc. In a specific example, communication scheduling component 552 may implement a finite impulse response (FIR) or infinite impulse response (IIR) filter to compute the throughput based at least in part on the one or more filtering coefficients and an instantaneous rate for data transmission (e.g., packet size divided by transmission duration). For example, the IIR filter may compute:

$$T(n+1)=(1-\alpha)*T(n)+\alpha*x(n)$$

and the FIR filter may compute:

$$T(n) = \sum_{k=0}^{M} \beta(k)*x(n-k)$$

where T(n) and T(n+1) are throughputs at a time period n (e.g., at a subframe, transmission time interval, or some other measurement of time related or unrelated to the communication timeline of the wireless communication technology), α and β are the filtering coefficients known by the communication scheduling component 552 and/or scheduling parameter component 532 (where β(k) may be different for each k), which may be configured at the UE 515, specified by the scheduling parameter component 532 and received by scheduling parameter receiving component 550, etc., as described, x(n) is the instantaneous rate for data transmission in time period n (e.g., packet size transmitted at time period n divided by a transmission time unit), and M is a historical number of time periods n used in computing the throughput.

In yet another example, the one or more parameters can relate to a ratio between a resource grant for first communication link 525 and for second communication link 526. Thus, in an example, scheduling parameter component 532 can transmit the ratio, scheduling parameter receiving component 550 can receive the ratio, and communication scheduling component 552 can configure communications over second communication link 526 by computing an amount of data to schedule based on the received resource grant from resource granting component 530 and the received ratio (e.g., multiplying the size of the received resource grant by the ratio). Thus, it is to be appreciated that when the resource grant for the first communication link 525, which can be provided dynamically, changes, the data to schedule on the second communication link 526 may also change based on the ratio. In one example, scheduling parameter component 532 can determine the ratio based on channel quality of one or more channels over first communication link 525.

Additionally, for example, the one or more parameters can relate to a ratio between throughput rates for first communication link 525 and for second communication link 526. Thus, in an example, scheduling parameter component 532 can transmit the ratio, scheduling parameter receiving component 550 can receive the ratio, and communication scheduling component 552 can configure communications over second communication link 526 by computing an amount of data to configure based on a throughput of first communication link 525 and the received ratio (e.g., multiplying the throughput by the ratio). In an example, communication scheduling component 552 can determine the throughput achievable over the first communication link 525 based on the serving grant provided by the eNodeB 505 for the first communication link 525 (e.g., based on an amount of resources provided by the serving grant, a modulation and coding scheme used in communicating over the serving grant, etc.). In an example, the period of time over which to observe the throughput may be configured by eNodeB 505 as well. In an example, communication scheduling component 552 can measure throughput of communications with WLAN AP 506 over second communication link 526 to determine an achieved throughput using one or more throughput calculation parameters (e.g., parameters specifying how often to update the calculated throughput, parameters related to determining the throughput in a sliding window of observation, etc.), as described. Communication scheduling component 552 can accordingly configure more or less data on second communication link 526 in subsequent transmissions to adhere to the target throughput determined based on the ratio to the throughput over the first communication link 525. For example, parameters related to throughput calculation (e.g., an interval after which to update the throughput, a size of a sliding window to observe in calculating the throughput, etc.) can also be received in the one or more parameters from scheduling parameter component 532, can be default parameters configured by UE 515 (e.g., based on a configuration when establishing communications with eNodeB 505, stored in a memory of UE 515, and/or the like), etc.

In another example, the one or more parameters can relate to a ratio of buffered data to be transmitted over second communication link 526. In this example, communicating component 540 can communicate a buffer status report to eNodeB 505, as described, and resource granting component 530 can determine a resource grant for first communication link 525 based on the buffer status report and the ratio. The ratio, in this example, can be signaled and/or determined prior to scheduling the resource grant based on the buffer status report. In any case, communicating component 540 receives the resource grant from eNodeB 505, and communication scheduling component 552 can configure communications from the buffer over first communication link 525 based on the resource grant, and over second communication link 526 based on the ratio and/or the amount of data remaining in the buffer. Thus, for example, resource granting component 530 can schedule a smaller grant for first communication link 525 by indicating a larger ratio for scheduling communications over second communication link 526. As described in one example, the ratio can be determined based on quality of first communication link 525.

In a further example, the one or more parameters can relate to a response to a request for approval to transmit a certain amount of data over second communication link 526. Thus, for example, method 600 may optionally include, at Block 622, transmitting, to the first access point, a request for resources for communicating with the second access point. Scheduling parameter requesting component 554 can transmit, to the first access point (e.g., eNodeB 505), the request for resources for communicating with the second access point (e.g., WLAN AP 506 over the second communication link 526). Similarly, method 700 may optionally include, at Block 722, receiving, from the UE, a request for resources for communicating with the second access point. Scheduling parameter request receiving component 536 can receive, from the UE (e.g., UE 515), the request for resources for communicating with the second access point (e.g., WLAN AP 506). For example, scheduling parameter requesting component 554 may generate the request for resources based at least in part on computing resources for achieving a desired throughput (e.g., over the second communication link 526 and/or the first communication link 525), a reported buffer status, a previous grant received for the first communication link 525, a throughput achieved or achievable over the first communication link 525 (e.g., based on modulation and coding scheme), and/or the like. In any case, in this example, scheduling parameter request receiving component 524 can obtain the request, and can indicate whether the request is granted or denied, an alternative amount of resources that can be utilized to transmit data, etc. Scheduling parameter requesting component 554 can receive the response, and can accordingly transmit data over second communication link 526 based on the response.

In the above examples, where the parameters are based on the resource grant for the first communication link 525, scheduling parameter component 532 may send the one or more parameters for communicating over the second communication link 526 less often than the resource grant. In any case, scheduling parameter component 532 can periodically update and transmit the one or more parameters, scheduling parameter receiving component 550 can receive the updated parameter(s), and communication scheduling component 552 can ensure communications over second communication link 526 comply with the parameter(s).

Moreover, for example, scheduling parameter component 532 may generate the one or more parameters described above based on feedback received from the UE 515, where the feedback can relate to channel conditions (e.g., a received signal strength indicator (RSSI)) with WLAN AP 506, an MCS, a channel rate, channel interference, or other reports from the UE 515 (e.g., regarding second communication link 526). Thus, for example, scheduling parameter component 532 may generate the one or more parameters to indicate a higher resource usage for the second communication link 526 where the channel conditions over the first communication link 525 achieve a threshold. It is to be appreciated that scheduling parameter component 532 may additionally or alternatively generate the one or more parameters based on similar feedback information received from the WLAN AP 506 (e.g., feedback of communicating with UE 515), which eNodeB 505 may receive from WLAN AP 506 over backhaul link 534. In addition, for example, scheduling parameter component 532 may generate the ratios or other grants based on limitations of the WLAN AP 506 that may be communicated to eNodeB 505 (e.g., an available bandwidth, a number of users or current connections, an average throughput, etc. of the WLAN AP 506).

In addition, scheduling parameter component 532 may generate and transmit the one or more parameters per component carrier, per logical channel, per logical channel group, etc. over communication links 525 and 526 or for all channels. For example, a logical channel having a guaranteed bit rate (e.g., for voice over LTE), scheduling parameter component 532 may assign a maximum amount of resources for utilization over second communication link 526, whereas scheduling parameter component 532 may use more dynamic allocations of resources (e.g., based on ratios of the resource grant for the first communication link 525) for other channels. Also, it is to be appreciated that scheduling parameter component 532 can signal the one or more parameters (e.g., for a given component carrier, channel, channel group, etc.) related to the parameters over an RRC or similar communication layer to UE 515. It is to be appreciated that the scheduling parameter component 532 can modify the parameters for all component carriers, channels, channel groups, etc., or for certain component carriers, channel groups, etc. by signaling parameters to the UE 515.

In any case, the one or more parameters may also include one or more validation parameters that specify a start time, stop time, duration, interval, etc., as described above, for configuring the communications using the one or more parameters. For example, scheduling parameter component 532 can communicate the one or more validation parameters to the UE 515, scheduling parameter receiving component 550 can receive the one or more validation parameters, and communication scheduling component 552 can configure communications with WLAN AP 506 starting at the specified start time, ending at the specified end time, for the specified duration after receiving the parameters, according to an interval specified by the parameters, etc. For example, after the end time or the end of the duration, communication scheduling component 552 can configure communications with the WLAN AP 406 using one or more default parameters configured at the UE 515, one or more next received parameters from eNodeB 505 or another access point, etc.

Figure 8:
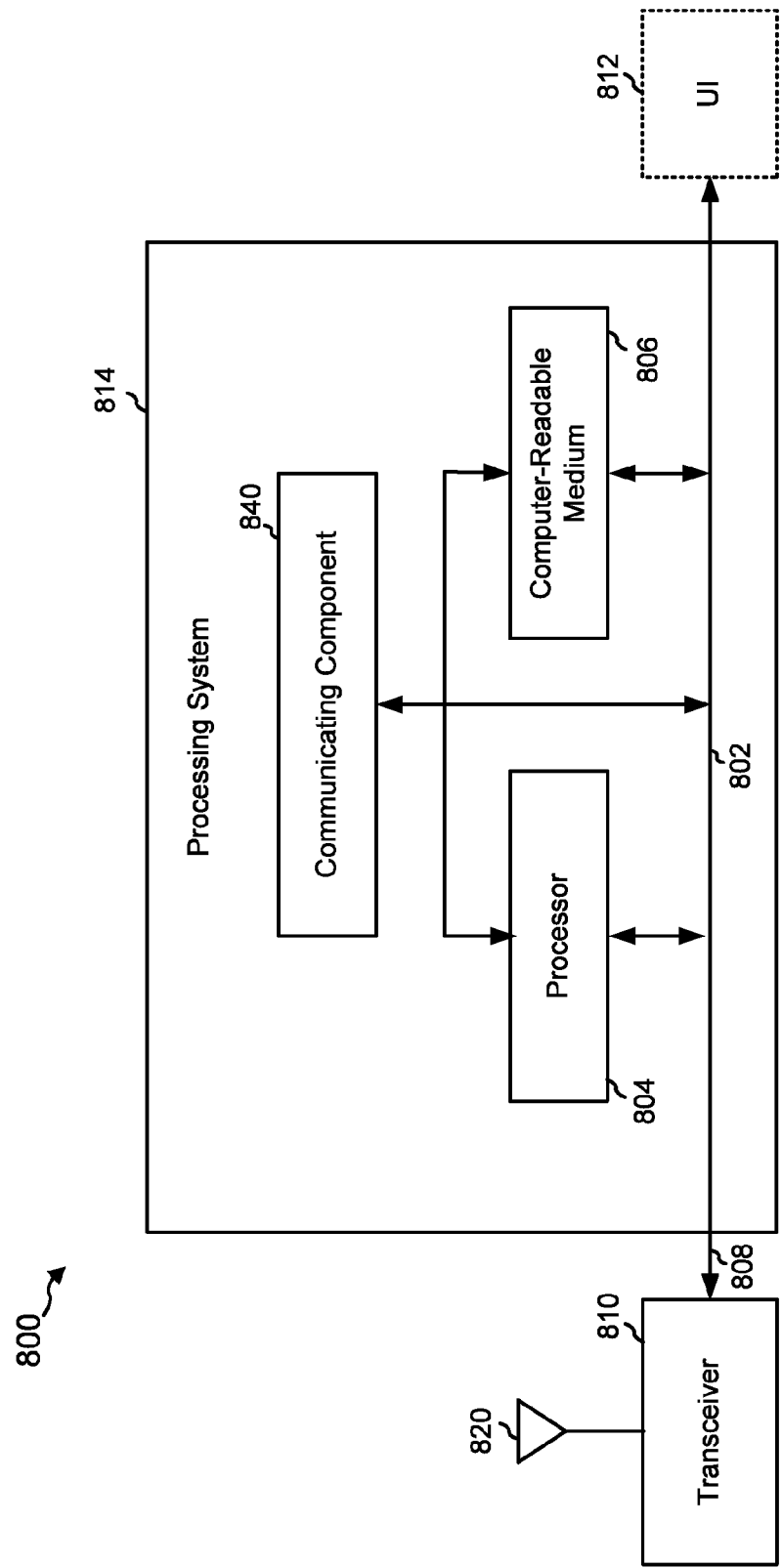
FIG. 8 is a block diagram conceptually illustrating an example hardware implementation for an apparatus employing a processing system configured in accordance with various aspects of the present disclosure.

FIG. 8 is a block diagram conceptually illustrating an example hardware implementation for an apparatus 800 employing a processing system 814 configured in accordance with an aspect of the present disclosure. The processing system 814 includes a communicating component 840. In one example, the apparatus 800 may be the same or similar, or may be included with one of the UEs and/or eNodeBs described in various Figures. In such example, the communicating component 840 may correspond to, for example, the communicating component 520, the communicating component 540, etc., and may thus be configured to perform functions described of the various components thereof, functions described in methods 600 and 700 in FIGS. 6 and 7, etc. In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (e.g., central processing units (CPUs), microcontrollers, application specific integrated circuits (ASICs), field programmable gate arrays (FPGAs)) represented generally by the processor 804, and computer-readable media, represented generally by the computer-readable medium 806. The bus 802 may also link various other circuits such as timing sources, peripherals, voltage regulators, and power management circuits, which are well known in the art, and therefore, will not be described any further. A bus interface 808 provides an interface between the bus 802 and a transceiver 810, which is connected to one or more antennas 820 for receiving or transmitting signals. The transceiver 810 and the one or more antennas 820 provide a mechanism for communicating with various other apparatus over a transmission medium (e.g., over-the-air). Depending upon the nature of the apparatus, a user interface (UI) 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described herein for any particular apparatus. The computer-readable medium 806 may also be used for storing data that is manipulated by the processor 804 when executing software. The communicating component 840 as described above may be implemented in whole or in part by processor 804, or by computer-readable medium 806, or by any combination of processor 804 and computer-readable medium 806.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for scheduling communications in wireless networks using traffic aggregation, comprising:

communicating, by a user equipment (UE), with a first access point using a first RAT to access a first wireless network over a first connection;

communicating, by the UE, with a second access point using a second RAT to access a second wireless network over a second connection, wherein the second RAT supports opportunistic communication, and wherein communicating with the second access point is based at least in part on the first access point configuring traffic aggregation for the UE to communicate with both of the first access point and the second access point;

receiving, by the UE and from the first access point after the traffic aggregation is configured, one or more parameters related to determining resources for scheduling, by the UE, communications with the second access point over the second connection, wherein the one or more parameters are related to scheduling the communications over the second connection and based on the second RAT; and configuring, by the UE determining the resources based at least in part on the one or more parameters, the communications with the second access point, in the traffic aggregation with the first access point.

2. The method of claim 1, wherein the one or more parameters include a maximum packet size for communicating with the second access point.

3. The method of claim 1, wherein the one or more parameters include a packet size for communicating with the second access point.

4. The method of claim 1, further comprising transmitting a buffer status report to the first access point, wherein the one or more parameters include a differential between the buffer status report and a resource grant received for communicating with the first access point to be used in configuring communications with the second access point.

5. The method of claim 1, wherein the one or more parameters include a target or maximum throughput for communicating with the second access point for a duration.

6. The method of claim 5, wherein the one or more parameters include one or more additional parameters for calculating the resources for achieving the target or maximum throughput, wherein configuring communications with the second access point is based at least in part on the resources.

7. The method of claim 1, wherein the one or more parameters include a ratio between resources of a resource grant received for communicating with the first access point and resources for scheduling communications with the second access point, and wherein configuring communications with the second access point includes determining the resources for scheduling communications with the second access point based at least in part on applying the ratio to resources of the resource grant.

8. The method of claim 1, wherein the one or more parameters include a ratio between a determined throughput rate in communicating with the first access point and a throughput rate for scheduling communications with the second access point, and wherein configuring communications with the second access point includes determining the throughput rate for scheduling communications with the second access point based at least in part on applying the ratio to the throughput rate in communicating with the first access point.

9. The method of claim 1, wherein the one or more parameters include a ratio of buffered data to communicate with the second access point, and wherein configuring communications with the second access point comprises determining the resources based at least in part on applying the ratio to an amount of data in a buffer for communicating in the first wireless network.

10. The method of claim 1, further comprising transmitting, to the first access point, a request for communicating using an amount of resources with the second access point, wherein the one or more parameters include a response to the request.

11. The method of claim 1, wherein the one or more parameters correspond to communicating with the second access point over one or more component carriers, one or more logical channels, or one or more logical channel groups.

12. The method of claim 1, wherein the first RAT is a wireless wide area network technology and the second RAT is a wireless local area network technology.

13. The method of claim 1, further comprising transmitting feedback information regarding communicating with the second access point to the first access point, wherein the one or more parameters are based at least in part on the feedback information.

14. The method of claim 13, wherein the feedback information includes at least one of channel conditions with the second access point, a modulation and coding scheme, a data rate, or a measure of channel interference.

15. The method of claim 1, wherein receiving the one or more parameters comprises receiving one or more validation parameters specifying at least one of a start time, a stop time, a duration, or an interval for using the one or more parameters in determining the resources for configuring communications with the second access point.

16. The method of claim 1, wherein communicating with the second access point comprises accessing the first wireless network via the second wireless network to implement the traffic aggregation.

17. An apparatus for scheduling communications in wireless networks using traffic aggregation, comprising:
a transceiver for communicating one or more signals with one or more access points;
a memory; and
at least one processor coupled to the memory, wherein the at least one processor is configured to:
communicate, via the transceiver, with a first access point using a first RAT over a first connection to access a first wireless network;
communicate, via the transceiver, with a second access point using a second RAT over a second connection to access a second wireless network, wherein the second connection is configured by the first access point to implement traffic aggregation with the first connection, and wherein the second RAT supports opportunistic communication;
receive, via the transceiver and from the first access point after the traffic aggregation is configured, one or more parameters related to determining resources for scheduling communications for communicating, via the transceiver, with the second access point over the second connection, wherein the one or more parameters are related to scheduling the communications over the second connection and based on the second RAT; and
schedule, via the transceiver and by determining the resources based at least in part on the one or more parameters, communications with the second access point, in the traffic aggregation with the first access point.

18. The apparatus of claim 17, wherein the one or more parameters include a maximum packet size or a packet size for communicating with the second access point.

19. The apparatus of claim 17, wherein the at least one processor is further configured to transmit a buffer status report to the first access point, wherein the one or more parameters include a differential between the buffer status report and a resource grant received for communicating with the first access point be used in configuring communications with the second access point.

20. The apparatus of claim 17, wherein the one or more parameters include a target or maximum throughput for communicating with the second access point for a duration.

21. The apparatus of claim 17, wherein the one or more parameters include a ratio between resources of a resource grant received for communicating with the first access point and resources for scheduling communications with the second access point, and wherein the at least one processor is configured to schedule communications with the second access point by determining the resources for scheduling communications with the second access point based at least in part on applying the ratio to resources of the resource grant.

22. The apparatus of claim 17, wherein the one or more parameters include a ratio between a determined throughput rate in communicating with the first access point and a throughput rate for scheduling communications with the second access point, and wherein the at least one processor is configured to schedule communications with the second access point by determining the resources for scheduling communications with the second access point based at least in part on applying the ratio to the throughput rate in communicating with the first access point.

23. The apparatus of claim 17, wherein the one or more parameters include a ratio of buffered data to communicate with the second access point, and wherein the at least one processor is configured to apply the ratio to an amount of data in a buffer for communicating in the first wireless network.

24. The apparatus of claim 17, wherein the at least one processor is further configured to transmit, to the first access point, a request for communicating using an amount of resources with the second access point, wherein the one or more parameters include a response to the request.

25. The apparatus of claim 17, wherein the one or more parameters correspond to communicating with the second access point over one or more component carriers, one or more logical channels, or one or more logical channel groups.

26. The apparatus of claim 17, wherein the at least one processor is further configured to transmit feedback information regarding communicating with the second access point to the first access point, wherein the one or more parameters are based at least in part on the feedback information.

27. The apparatus of claim 17, wherein the at least one processor is configured to receive one or more validation parameters specifying at least one of a start time, a stop time, a duration, or an interval for using the one or more parameters in configuring communications with the second access point.

28. An apparatus for scheduling communications in wireless networks using traffic aggregation, comprising:
    means for communicating with a first access point using a first RAT over a first connection to access a first wireless network, and communicating with a second access point using a second RAT over a second connection to access a second wireless network, wherein the second connection is configured by the first access point to implement traffic aggregation with the first connection, and wherein the second RAT supports opportunistic communication;
    means for receiving, via the means for communicating and from the first access point after the traffic aggregation is configured, one or more parameters related to determining resources for scheduling communications for communicating, via the means for communicating, with the second access point over the second connection, wherein the one or more parameters are related to scheduling the communications over the second connection and based on the second RAT; and
    means for scheduling, via the means for communicating and by determining the resources based at least in part on the one or more parameters, communications with the second access point, in the traffic aggregation with the first access point.

29. The apparatus of claim 28, wherein the one or more parameters include a maximum packet size or a packet size for communicating with the second access point.

30. An non-transitory computer-readable storage medium comprising computer-executable code for scheduling communications in wireless networks using traffic aggregation, the code comprising:
    code for causing at least one computer to communicate, by a user equipment (UE), with a first access point using a first RAT over a first connection to access a first wireless network, and to communicate, by the UE, with a second access point using a second RAT over a second connection to access a second wireless network, wherein the second connection is configured by the first access point to implement traffic aggregation with the first connection, and wherein the second RAT supports opportunistic communication;
    code for causing the at least one computer to receive, by the UE and from the first access point after the traffic aggregation is configured, one or more parameters related to determining resources for scheduling, by the UE, communications with the second access point over the second connection, wherein the one or more parameters are related to scheduling the communications over the second connection and based on the second RAT; and
    code for causing the at least one computer to schedule, by the UE determining the resources based at least in part on the one or more parameters, communications with the second access point, in the traffic aggregation with the first access point.

* * * * *